March 20, 1934. W. T. KNIESZNER 1,951,733
SYSTEM AND APPARATUS FOR POWER FACTOR CORRECTION
Filed July 17, 1929
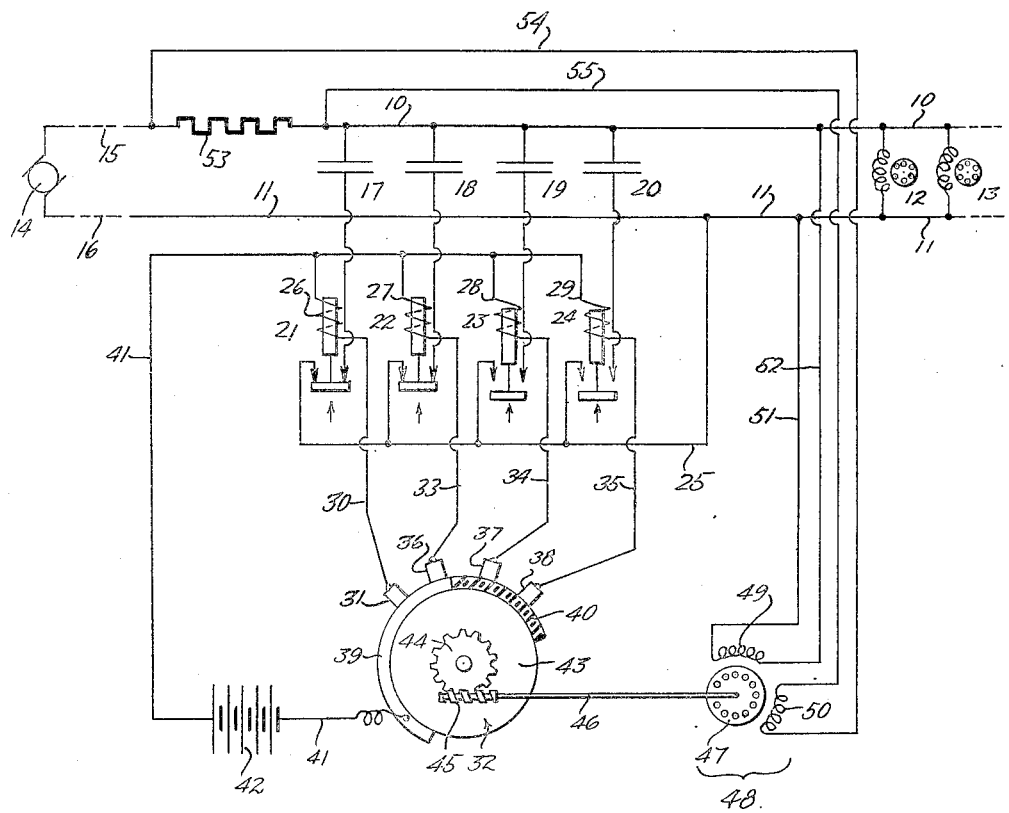

Patented Mar. 20, 1934

1,951,733

UNITED STATES PATENT OFFICE 1,951,733

SYSTEM AND APPARATUS FOR POWER FACTOR CORRECTION

William T. Knieszner, New York, N. Y., assignor to Products Protection Corporation, a corporation of Delaware Application July 17, 1929, Serial No. 378,886

3 Claims. (Cl. 172—246)

This invention relates to power transmission and more particularly to power factor correction.

One of the objects of this invention is to provide a simple, thoroughly practical and efficient power consumption apparatus for maintaining the power factor, of an alternating current power supply line, as near unity as possible, even though the load may be subject to such variations as cause changes in the power factor. Another object is to provide a system and apparatus of the above-mentioned character in which the power factor may be maintained at any desired value, even though such changes take place in the load as tend to cause departure of the power factor from the intended value. Another object is to provide an apparatus of the above-mentioned character that may be embodied in thoroughly practical, durable and rugged form, require a minimum, if any, manual supervision or attention, and will be characterized by low cost of operation and maintenance. Another object is to provide a system and apparatus of the above-mentioned nature that will be well adapted to meet the varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing I have shown diagrammatically a preferred form of the various possible embodiments of my invention.

Referring now to the drawing, I have shown the main line conductors 10—11 of an alternating current power supply circuit, illustratively single phase, from which energy is supplied to an inductive load illustratively shown in the form of induction motors 12 and 13. The circuit 10—11 is supplied from a suitable generator or alternator 14 over a transmission line indicated in broken lines at 15—16.

Such a circuit as thus far described is generally typical of industrial power installations and where the load is largely made up of motors such as induction motors or any other current-consuming device taking a lagging current from the line, the power factor is less than unity and its departure from unity varies with the extent of the inductive character of the load. Thus, for example, the power factor departs to a greater extent from unity as more motors 12, 13 are connected to the line 10—11.

Because of the many disadvantages attendant upon low power factor, it is highly desirable to avoid low power factor and to maintain the latter as near unity as is possible even though the character of the load varies. Accordingly, I provide a suitable number of condensers 17, 18, 19 and 20, illustratively shown as four in number, each having one terminal thereof connected to one side of the consumption circuit and hence to the conductor 10. The other terminal of each condenser leads to one contact of a remote controlled switch adapted to connect it to the other side or conductor 11 of the consumption circuit. Thus, I have shown diagrammatically switches 21, 22, 23 and 24 through the contacts and contact-making member of which the other terminals of the condensers 17, 18, 19 and 20, respectively, may be connected, by way of conductor 25, to the other side or conductor 11 of the load circuit 10—11.

These switches 21, 22, 23 and 24 may be of any suitable form and I have illustratively shown them as being of the solenoid type of switch, the cores of which are adapted to be moved into circuit-closing position upon energization of the windings 26, 27, 28 and 29, respectively. Deenergization of the winding permits the core member to drop and thus open the switch.

One terminal of coil 21 is connected by conductor 30 to a fixed brush 31 adapted to coact with a contactor device generally indicated at 32. Similarly, a terminal of the remaining coils 22, 23 and 24 is connected by conductors 33, 34 and 35 to fixed brushes 36, 37 and 38, respectively, the brushes being preferably fixed and spaced peripherally with respect to the rotatable arcuate sectors 39 and 40 of the contactor 32. The remaining terminals of the coils of the several switches are connected by conductor 41, through a suitable source of potential, conveniently in the form of a low voltage source indicated as a battery 42, to the segment 39 which is made of any suitable conducting material, such as the material used in commutator construction. The segment 40, however, is of non-conducting material and may conveniently consist of bakelite, hard rubber, or the like.

The segments 39 and 40 are suitably mounted upon a rotatable member 43, which is rotatably supported in any suitable manner. Depending upon the position of the member 43 relative to the fixed brushes 31, 36, 37 and 38, and hence depending upon how many of the several brushes are in contact with conducting segment 39, a corresponding number of switch-controlling coils will be energized and the corresponding switches closed and held closed. Such brushes as have the non-conducting segment 40 brought into engagement therewith thus have their respective coil circuits interrupted and corresponding coils remain deenergized and the corresponding switches remain open.

The member 43, and hence the segments 39—40 carried thereby, is rotatable about its axis in accordance with the phase relation between the current and the voltage effective respectively in and across the conductors 10—11. Conveniently, a worm wheel 44 is coaxially mounted with the rotatable member 43 of the contactor 32 and is adapted to be driven by a worm 45 meshing therewith. The worm 45 is connected by a shaft 46 to the rotor or movable element 47 of a combined power factor indicator and motor generally indicated at 48.

The device 48 may conveniently take the form in general of a polyphase, that is two phase, motor having a rotor 47 and two windings 49 and 50 suitably displaced electrically. Winding 49 is connected by conductors 51, 52 across the conductors 10, 11 of the load circuit and is thus made responsive substantially to the alternating current potential effective across the supply conductors.

Inserted in one of the conductors of the load circuit and on that side of the points to which the condensers may be connected which is adjacent the initial source or alternator 14, is a resistance 53 preferably of low ohmic value. Conductors 54 and 55 connect the winding 50 of the device 48 in shunt relation to the resistance 53. Winding 50 is thus made responsive to a potential which is an IR drop across the resistance 53 and which is hence in phase with the current flowing to the load 12—13 and to any condensers that may be in circuit.

Preferably, windings 49 and 50 have substantially identical characteristics and preferably, also, are designed to operate at the same terminal voltage; accordingly, suitable means, such as a transformer or transformers or a resistance (not shown), may if desired be provided to insure that the voltages across conductors 51—52 and 54—55 are substantially equal.

With the parts in the position shown in the drawing contactor 39 has been rotated in clockwise direction to bring brushes 36 and 31 into contact therewith and hence to energize coils 27 and 26 of the switches 22 and 21, respectively; these switches are closed and condensers 17 and 18 are bridged across the consumption circuit.

Let it be assumed that it required the inclusion, in the circuit, of condensers 17 and 18 to bring the power factor up to unity.

Assuming now that the inductive load has been increased, as by adding more induction motors like the motors 12, 13, the power factor at once departs from unity, due to the lagging current taken by this additional inductive load. This lagging current causes the potential drop across the resistance 53 to lag to a corresponding degree and hence the current in winding 50 of the power factor indicator 48 likewise lags, all with respect to the current in the winding 49 which, as above noted, bears a fixed and invariable phase relation to the potential across the conductors 10—11.

There are thus effective in the windings 49—50 two currents, one of which is electrically out of phase with respect to the other, and this fact, in coaction with the electrically displaced relation of the windings 49—50, results in the production of a rotating magnetic field to cause the rotor 47 to rotate.

The driving connections of the rotor 47 to the rotatable member 43 of the contactor 32 are such that the member 43 is rotated in clockwise direction, thus bringing the conducting segment 39 into contact with another brush or brushes, the corresponding circuits and switch coils of which become energized to connect across the line the corresponding condensers. Thus, let it be assumed that as soon as condenser 19 has been connected across the line due to the energization of windings 28 of switch 23, by contact of segment 39 with brush 37, the additional capacity represented by the condenser 19 has been sufficient to take a leading current of sufficient value to counterbalance the lagging component of the current taken by the added inductive load and that thus the power factor has been restored to unity.

This restoration of the power factor to unity causes the currents in the windings 49—50 to be in phase and hence there is produced no rotating magnetic field and rotation of the rotor 47 can no longer take place.

Should the inductive load be diminished as by cutting off induction motors, for example, a reversed action takes place. In such reversed action, the diminution of the inductive load results in a preponderance of the capacity load, the potential across the resistance 53 now leads the potential across the conductors 10—11 and likewise the current in winding 49 now leads the current in the winding 50 of the power factor indicator 48.

The two windings, under these circumstances, produce a rotating field in the reversed direction, the rotor 47 rotates in reversed direction, and continues to rotate the centers 39—40, now in counter-clockwise direction, until the non-conducting segment 40 has caused the cutting out of sufficient individual condensers as will bring the current in and potential drop across the resistance 53 substantially in phase with the potential across the conductors 10—11, a condition corresponding to unity power factor.

Thus, it will be seen that there has been provided in this invention an apparatus and system in which the several objects hereinbefore noted, as well as many thoroughly practical advantages, are successfully achieved.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a system of the character described, in combination, a source of alternating current supply, means forming an inductive load, a plurality of condensers, a plurality of switches, one for each condenser and adapted each to connect or disconnect a condenser relative to said source, a controlling coil for each switch, a rotatable contactor adapted upon rotation in one direction to affect said coils successively to successively connect condensers to said source and upon rotation in reversed direction to successively affect said coils to successively disconnect condensers from said source, and means for controlling the rotation of said rotatable contactor, said means comprising a rotor and two electrically displaced windings, means for impressing across one of said windings a potential substantially in phase with the potential applied to said load, and means for impressing across the other of said windings a potential that is substantially in phase with the current supplied to said load and to whatever condensers are connected across said source.

2. In a system of the character described, in combination, a source of alternating current supply, means forming an inductive load, a plurality of condensers, a plurality of switches, one for each condenser and adapted each to connect or disconnect a condenser relative to said source, a controlling coil for each switch, a rotatable contactor adapted upon rotation in one direction to affect said coils successively to successively connect condensers to said source and upon rotation in reversed direction to successively affect said coils to successively disconnect condensers from said source, and means for controlling the rotation of said rotatable contactor, said means comprising a rotor and two physically and electrically displaced windings, means for impressing across one of said windings a potential substantially in phase with the potential applied to said load, a resistance carrying current supplied to said load and to whatever condensers are connected to said source, and means connecting the other of said windings in shunt relation to said resistance.

3. In a system of the character described, in combination, a source of alternating current supply, means forming an inductive load, a plurality of condensers, a plurality of switches, one for each condenser and adapted each to connect or disconnect a condenser relative to said source, a controlling coil for each switch, a rotatable contactor adapted upon rotation in one direction to affect said coils successively to successively connect condensers to said source and upon rotation in reversed direction to successively affect said coils to successively disconnect condensers from said source, movable means whose position alters in response to changes in the phase relation between the potential of said source and the current supplied to said load and to whatever condensers are connected to said source, and means responsive to said last-mentioned means for effecting rotation of said rotatable contactor.

WILLIAM T. KNIESZNER.